(12) United States Patent
Oliveira et al.

(10) Patent No.: US 7,945,534 B1
(45) Date of Patent: May 17, 2011

(54) CONTINUOUS DATA BACKUP

(75) Inventors: Fernando Oliveira, Sudbury, MA (US); Jeffrey A. Schriesheim, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 812 days.

(21) Appl. No.: 11/595,272

(22) Filed: Nov. 9, 2006

Related U.S. Application Data

(62) Division of application No. 10/808,781, filed on Mar. 25, 2004, now Pat. No. 7,599,951.

(51) Int. Cl.
*G06F 7/00* (2006.01)
*G06F 17/00* (2006.01)
(52) U.S. Cl. .............................. 707/638; 715/751; 726/3
(58) Field of Classification Search .......................... None
See application file for complete search history.

(56) References Cited

U.S. PATENT DOCUMENTS

| | | | | |
|---|---|---|---|---|
| 6,092,215 | A * | 7/2000 | Hodges et al. .................... | 714/6 |
| 6,970,987 | B1 * | 11/2005 | Ji et al. ........................... | 711/162 |
| 7,274,696 | B1 * | 9/2007 | Sikdar ............................. | 370/391 |
| 2002/0010735 | A1 * | 1/2002 | McMillen et al. ............. | 709/201 |
| 2002/0161458 | A1 * | 10/2002 | Ahrens et al. .................... | 700/21 |

* cited by examiner

*Primary Examiner* — Sathyanarayan Pannala
(74) *Attorney, Agent, or Firm* — Muirhead and Saturnelli, LLC

(57) ABSTRACT

Handling writing new data includes creating a journal entry that points to a first storage location containing old data to be replaced by the new data, where the journal entry is maintained after writing the new data, allocating new storage space having a second storage location, and writing the new data to the new storage space at the second storage location. The storage space may be provided by at least one storage device. Allocating new storage space may include remapping a switch coupled to the at least one storage device. The new data may be written by a host coupled to the switch. The switch may present the host with a logical storage area that is created by the switch mapping to different locations of the at least one storage device. The mapping may be transparent to the host. The switch may include at least one processor and a corresponding memory. The journal entry may be part of a journal that is stored in the memory. The storage space may correspond to a disk array storage device. The journal entry may be stored in the disk array storage device. The journal entry may be stored outside the disk array storage device. Allocating new storage space may include remapping a switch coupled to the disk array storage device and where the journal entry is stored on the switch. Each of the journal entries also includes a time stamp and/or a result of writing the data.

20 Claims, 9 Drawing Sheets

CONTINUOUS DATA BACKUP

CROSS REFERENCE TO RELATED APPLICATIONS

This application is a divisional of U.S. patent application Ser. No. 10/808,781, filed Mar. 25, 2004 now U.S. Pat. No. 7,599,951, which is incorporated by reference herein.

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, it may be useful to provide data backup capability so that, in the event of a storage device failure, data may be recovered. Data backup capability may also be useful in instances where it is desirable to restore data to a previous state corresponding to the state of the storage device at a previous time. For example, after testing new software, it may be desirable to restore the storage device to a state that existed prior to the tests being performed. One way to provide backup capability is to simply make a complete copy of the data at specified times. However, if the time interval between copies is too long, then the ability to restore data to a particular time is affected since data may only be restored to the time of the most recent backup. For example, if data is completely backed up once every day, then it is only possible to restore data to a the state of a previous day. Providing more frequent complete backups may address this. However, since each complete backup requires additional storage, it may be impracticable to provide complete backups at too frequent a rate.

The problems associated with complete backups may be addressed, somewhat, by using incremental backups. In the case of incremental backups, an initial complete backup is performed. Following the complete backup, only data that has been modified since the last backup (incremental or complete) is save in each subsequent incremental backup. However, as the number of incremental backups increases, it becomes increasing complex to restore the data to a particular point since restoring data from an incremental backup requires first restoring the data from the complete backup and then applying each and every incremental backup until the desired state is reached. Thus, for example, if a complete backup is performed followed by two hundred incremental backups, then restoring the data to the state after the two hundredth incremental backup requires first performing a complete backup and then applying each and every one of the two hundred incremental backup, in sequence, until the desired state is reamed.

It is desirable to provide a solution that address the deficiencies of known backup techniques discussed above.

SUMMARY OF THE INVENTION

According to the present invention, handling writing new data includes creating a journal entry that points to a first storage location containing old data to be replaced by the new data, where the journal entry is maintained after writing the new data, allocating new storage space having a second storage location, and writing the new data to the new storage space at the second storage location. The storage space may be provided by at least one storage device. Allocating new storage space may include remapping a switch coupled to the at least one storage device. The new data may be written by a host coupled to the switch. The switch may present the host with a logical storage area that is created by the switch mapping to different locations of the at least one storage device. The mapping may be transparent to the host. The switch may include at least one processor and a corresponding memory. The journal entry may be part of a journal that is stored in the memory. The storage space may correspond to a disk array storage device. The journal entry may be stored in the disk array storage device. The journal entry may be stored outside the disk array storage device. Allocating new storage space may include remapping a switch coupled to the disk array storage device and where the journal entry is stored on the switch. Each of the journal entries also includes a time stamp and/or a result of writing the data.

According further to the present invention, computer software that handles writing new data, includes executable code that creates a journal entry that points to a first storage location containing old data to be replaced by the new data, where the journal entry is maintained after writing the new data, executable code that allocates new storage space having a second storage location, and executable code that writes the new data to the new storage space at the second storage location. The storage space may be provided by at least one storage device and where executable code that allocates new storage space remaps a switch coupled to the at least one storage device. The journal entry may be stored on the switch or at a location other than the switch. The computer software may also include executable code that provides a time stamp to each journal entry. The computer software may also include executable code that provides a result of writing the data to each journal entry.

According further to the present invention, restoring data to a storage device includes accessing a journal having a plurality of entries, where each of the entries points to prior data that existed on the storage device before a write caused the entry to be created, where there is an entry in the journal for each data write to the storage device that occurred after an initial time and, using each of the entries to remap the storage device to point to the prior data. The journal entries may include a time stamp. Using each of the entries to remap the storage device may include remapping the one of the entries having a most recent time stamp. Using each of the entries to remap the storage device may include changing in a map of a switch coupled to the storage device. The storage device may be a logical storage device presented by the switch and wherein remapping includes modifying the relationship between the logical storage device and physical storage devices coupled to the switch. The physical storage devices may be disk array storage devices. Accessing the journal may include accessing a memory of the switch.

According further to the present invention, a switch includes a plurality of input ports, a plurality of output ports, and at least one backplane interposed between the input ports and the output ports, where the backplane selectively connects input ports and output ports to provide that, in response to data being written at one of the input ports, a journal entry that is maintained after the data is written is created to point to a first storage location on storage space coupled to the output ports, the first location pointing to old data to be replaced by the new data, new storage space having a second storage location is allocated and the data is written to the new storage space at the second storage location. The switch may also include a memory that is part of the backplane, where the journal entry is stored in the memory. The switch may also include a processor that is disposed within the backplane. The processor may include executable code that causes the switch to create the journal entry and to allocate the new storage space.

According further to the present invention, a journal used for continuous backup of a storage device includes a first entry that points to a first storage location containing old data replaced by new data written to the storage device and a plurality of additional entries that point to respective additional storage locations containing old data replaced by new data written to the storage device, where for every write to the storage device that occurs after an initial time, there is a corresponding entry. Each of the entries may include a time stamp and/or a result of writing the data.

According further to the present invention, a data storage device, includes at least one disk drive that contains data, at least one host adaptor, coupled to the at least one disk drive, that receives data to be stored on the at least one disk drive, and computer software that handles writing new data, where the computer software includes executable code that creates a journal entry that points to a first storage location containing old data to be replaced by the new data, where the journal entry is maintained after writing the new data, executable code that allocates new storage space having a second storage location, and executable code that writes the new data to the new storage space at the second storage location.

DETAILED DESCRIPTION OF VARIOUS EMBODIMENTS

Figure 1:
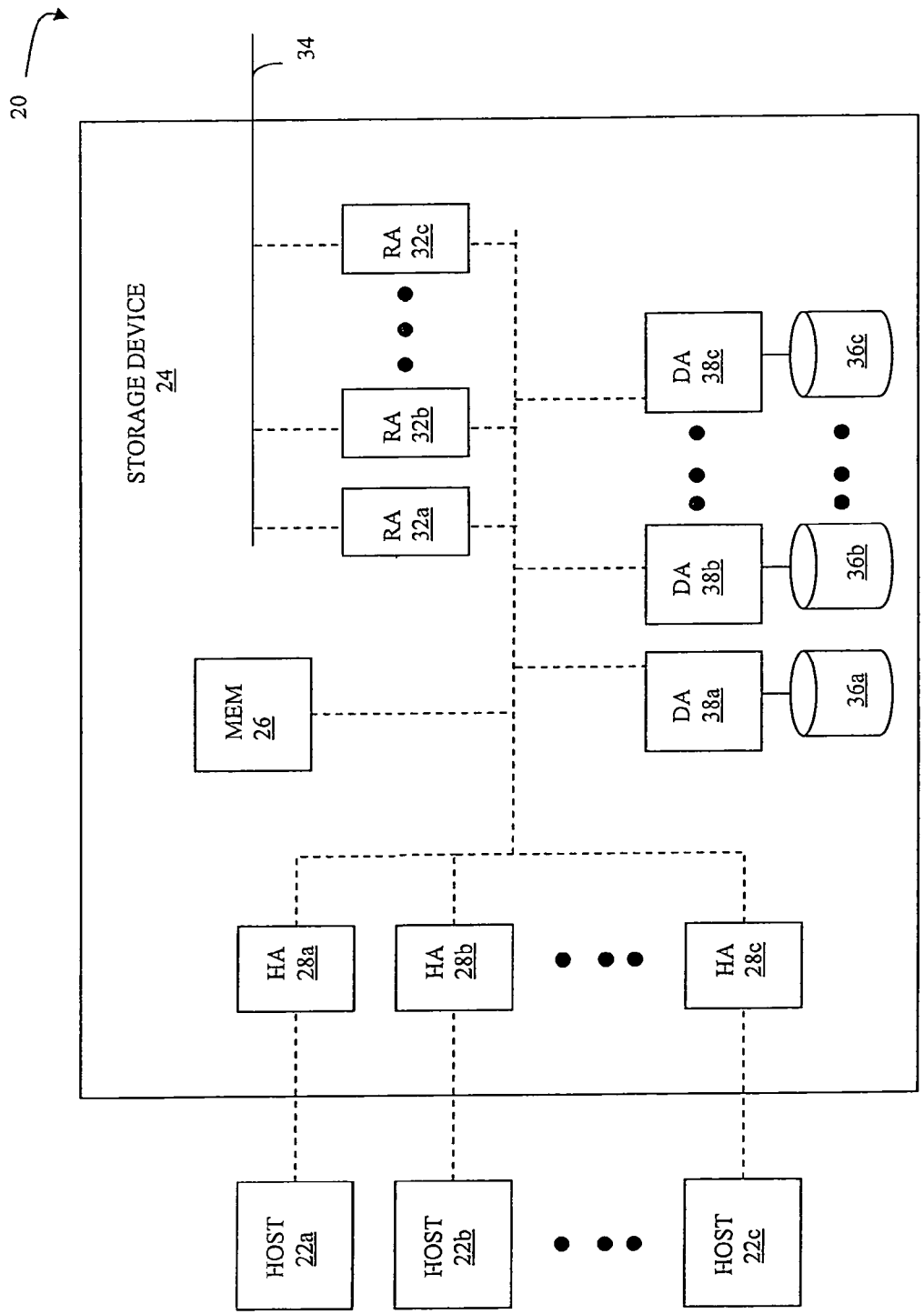
FIG. 1 is a schematic diagram showing a plurality of hosts and a data storage device used in connection with the system described herein.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown) that are also coupled to the RDF link 34.

The storage device 24 may be configured as a disk array and include one or more disks 36a-36c, each containing a different portion of data stored on the storage device 24. Each of the disks 36a-36c may be coupled to a corresponding disk adapter unit (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c. Use of the memory 26 is described in more detail hereinafter.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric.

Figure 2:
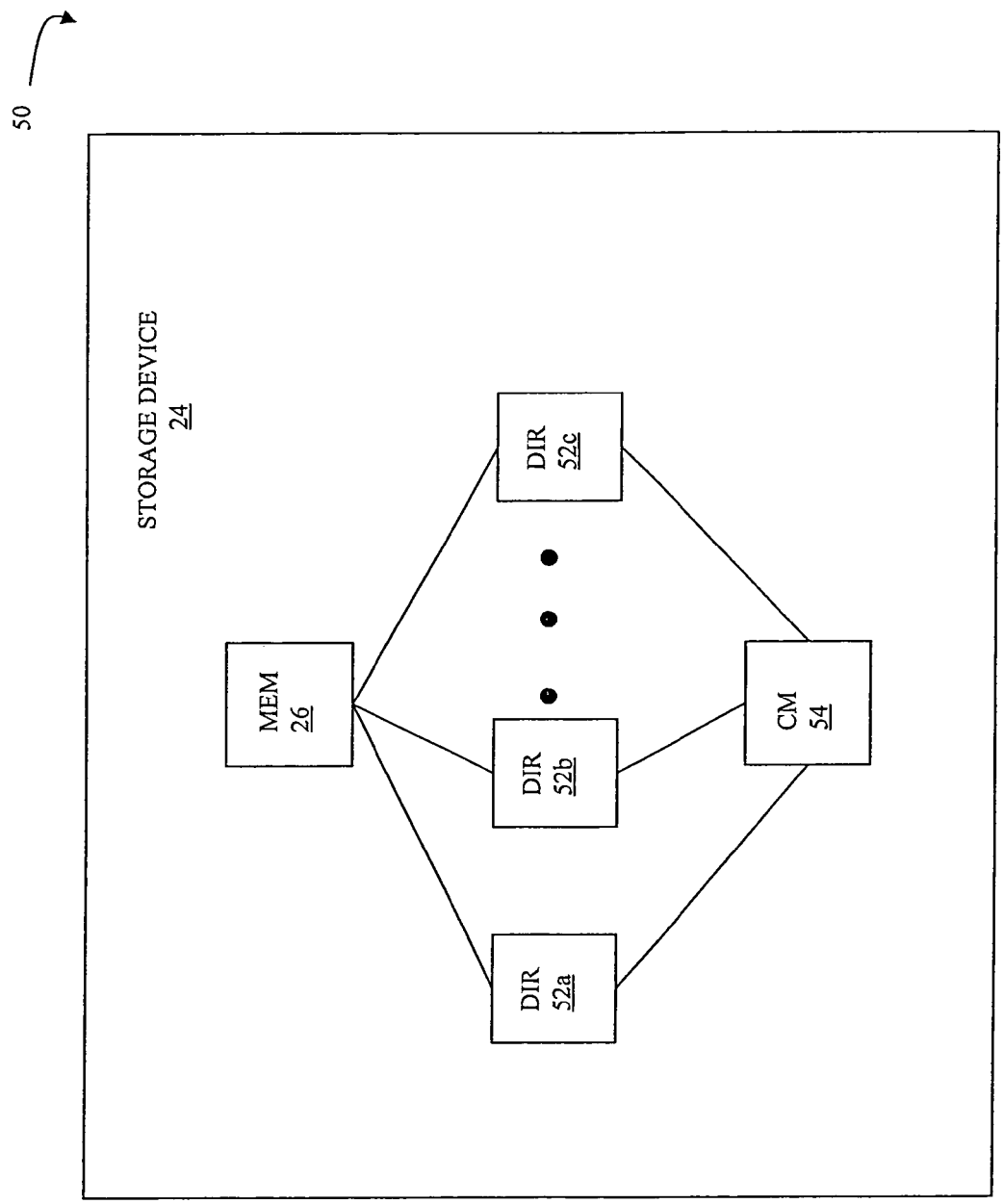
FIG. 2 is a diagram illustrating the storage device of FIG. 1 and interconnections between internal components thereof.

Referring to FIG. 2, a diagram 50 illustrates an embodiment of the storage device 24 where each of a plurality of directors 52a-52c are coupled to the memory 26. Each of the directors 52a-52c represents one of the HA's 28a-28c, RA's 32a-32c, or DA's 38a-38c. In an embodiment disclosed herein, there may be up to sixteen directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to, be received by an intended receiving one of the directors 52a-52c.

Figure 3:
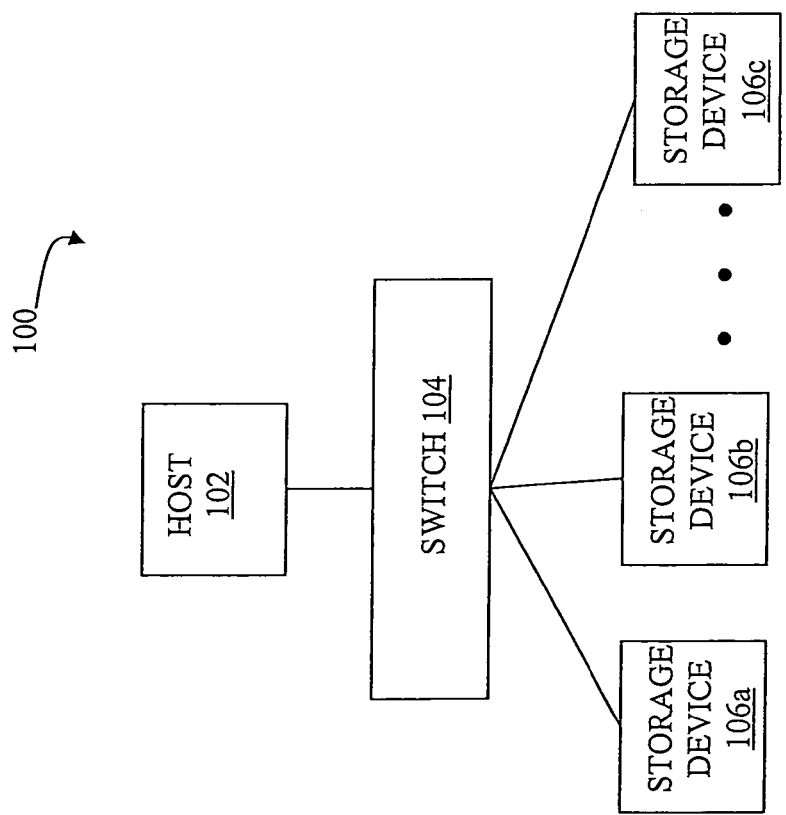
FIG. 3 is a diagram illustrating a host that accesses a plurality of storage devices through a switch in accordance with the system described herein.

Referring to FIG. 3, a diagram 100 illustrates a server 102 coupled to a switch 104. The switch 104 is coupled to a plurality of storage devices 106a-106c. One or more of the storage devices 106a-106c may be like the storage device 24 described above. Alternatively, it is possible that none of the storage devices 106a-106c are like the storage device 24 described above. The system described herein contemplates an environment where all of the storage devices 106a-106c are alike (homogenous) or an environment where some of the storage devices 106a-106c are different (heterogeneous). The couplings between the server 102, the switch 104, and the storage devices 106a-106c may be made in any appropriate fashion including (optionally) that one or more of the couplings is through one or more other devices (not shown) and/or through the Internet or some other network, of any size and configuration.

The switch 104 may be used to present to the server 102 one or more logical volumes or devices that correspond to storage on one or more of the storage devices 106a-106c. The switch 104 maps logical storage space presented to the server 102 to actual storage space on the storage devices 106a-106c. The storage space on the storage devices 106a-106c for any logical volume may or may not be contiguous even though the logical volume appears to the host 102 to be contiguous. In addition, the storage space for any logical volume may or may not span more than one of the storage devices 106a-106c. For any logical volume, the server 102 may be presented with a contiguous storage space irrespective of the mapping by the switch to the storage devices 106a-106c.

The switch 104 may allow for dynamic remapping of logical volumes presented to the server 102 during operation so that the remapping is somewhat transparent to the server 102. Thus, for example, logical storage space x1-x2 may be initially mapped to storage space y1-y2 on the storage devices 106a-106c and then may be remapped during operation to storage space y3-y4 on the storage devices 106a-106c. This remapping may occur many times. In addition, remapping may cause previously contiguous mapped space on the storage devices 106a-106c to become noncontiguous or cause previously noncontiguous mapped space on the storage devices 106a-106c to become contiguous. For example, logical-storage space x1-x2 may be initially mapped to storage space y1-y2 on the storage devices 106a-106c and may be remapped so that logical storage space x1-x1a is mapped to storage space y3-y4 on the storage devices 106a-106c while logical storage space x1a-x2 is remapped to storage space y5-y6 on the storage devices 106a-106c, where y3-y4 is not contiguous to y5-y6. After the remapping, the logical storage space x1-x2 appears contiguous to the server 102 even though the space x1-x2 is mapped to noncontiguous spaces on the storage devices 106a-106c.

Figure 4:
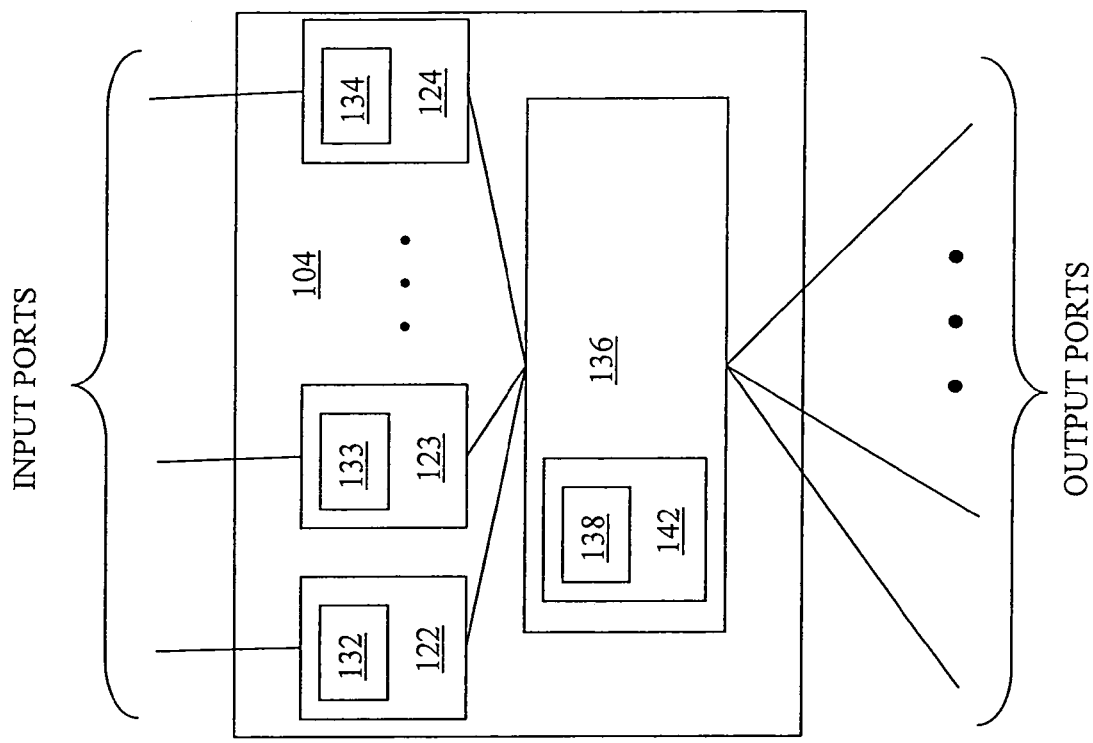
FIG. 4 is a schematic diagram illustrating internal components of a switch in accordance with the system described herein.

Referring to FIG. 4, the switch 104 is shown in more detail where each of a plurality of input ports for the switch 104 (each of which may be coupled to a host or other user of storage space) has one of a plurality of local processor boards 122-124 for controlling operation thereof. Each of the processor boards 122-124 includes a respective on-board memory 132-134 for local data storage thereon. Each of the processor boards 122-124 is coupled to a switch backplane 136, that handles routing of data and connections between the input ports and a plurality of output ports of the switch 104. The switch backplane 136 may be controlled by a backplane processor board 138 which includes memory 142. In some embodiments, the memory 142 is kcal to the processor board 138. In other embodiments, the memory 142 is global and thus accessible to one or more of the processor boards 122-124.

The switch backplane 136 acts as a multiplex that makes connections between input ports and output ports according to configuration information provided by the backplane processor board 138. In some embodiments, the memory 142 contains a switching table that controls mappings between input and output ports according to specific addresses provided at the input ports. The switch 104 may be implemented using off-the-shelf devices provided by companies such as Brocade and Cisco.

Figure 5:
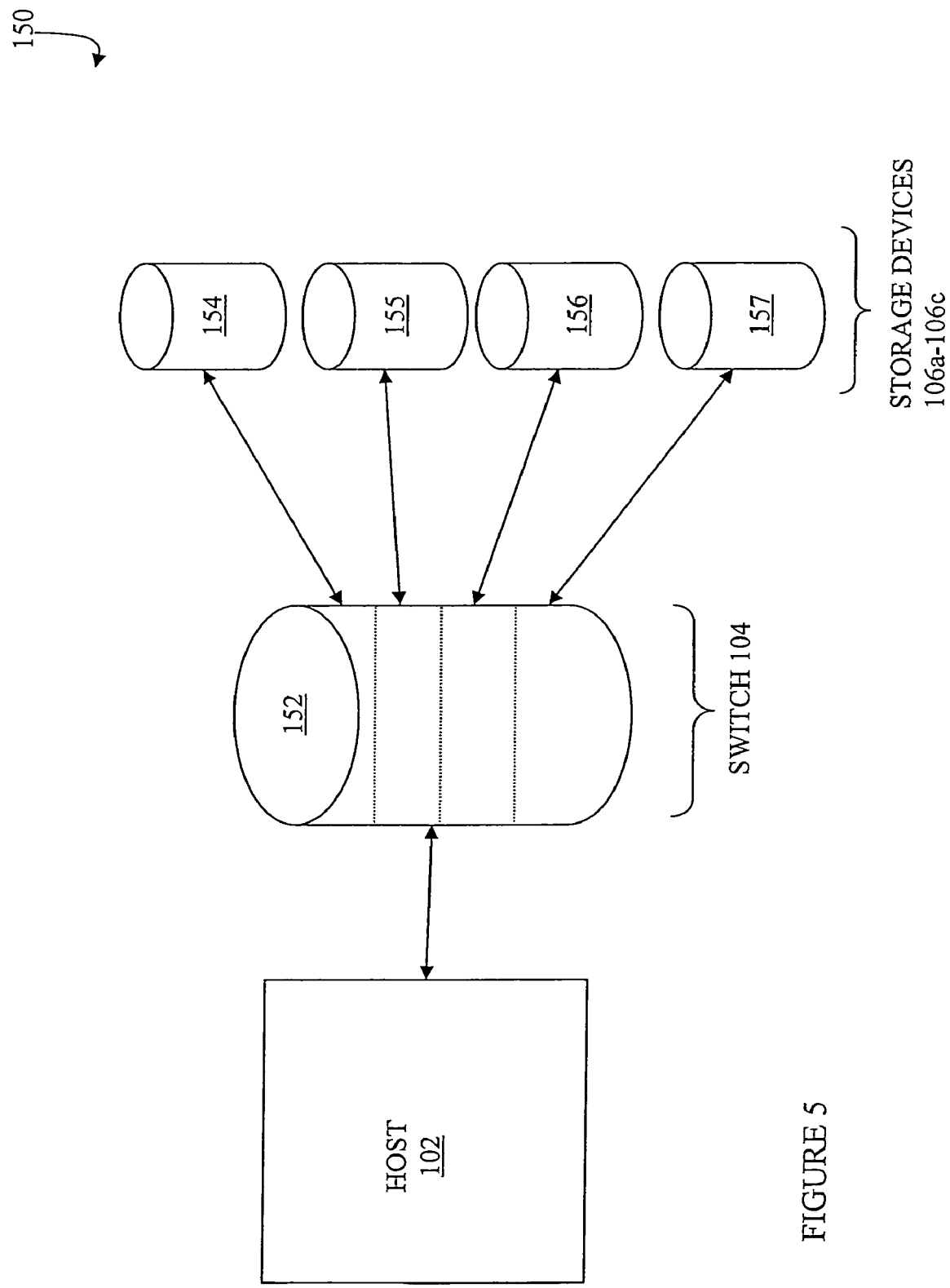
FIG. 5 is a diagram illustrating a host accessing a logical device that corresponds to a plurality of actual storage areas according to the system described herein.

Referring to FIG. 5, a diagram 150 illustrates a mapping provided by the switch 104 so that the host 102 is presented with a logical device 152 that corresponds to areas of storage 154-157 on the storage devices 106a-106c. A first portion of the logical device 152 corresponds to the storage area 154 on the storage devices 106a-106c. Similarly, different areas of the logical device 152 correspond to the storage area 155, the storage area 156, or the storage area 157. The switch 104 provides a mapping that is transferred to the host 102 so that the host is presented with the logical device 152 as a single contiguous storage device. The storage areas 154-157 may represent storage space on one of the storage devices 106a-106c or on more than one of the storage devices 106a-106c. Similarly, the storage areas 154-157 may or may not be contiguous. The switch 104 handles mapping to the storage devices 106a-106c in a conventional manner.

Figure 6:
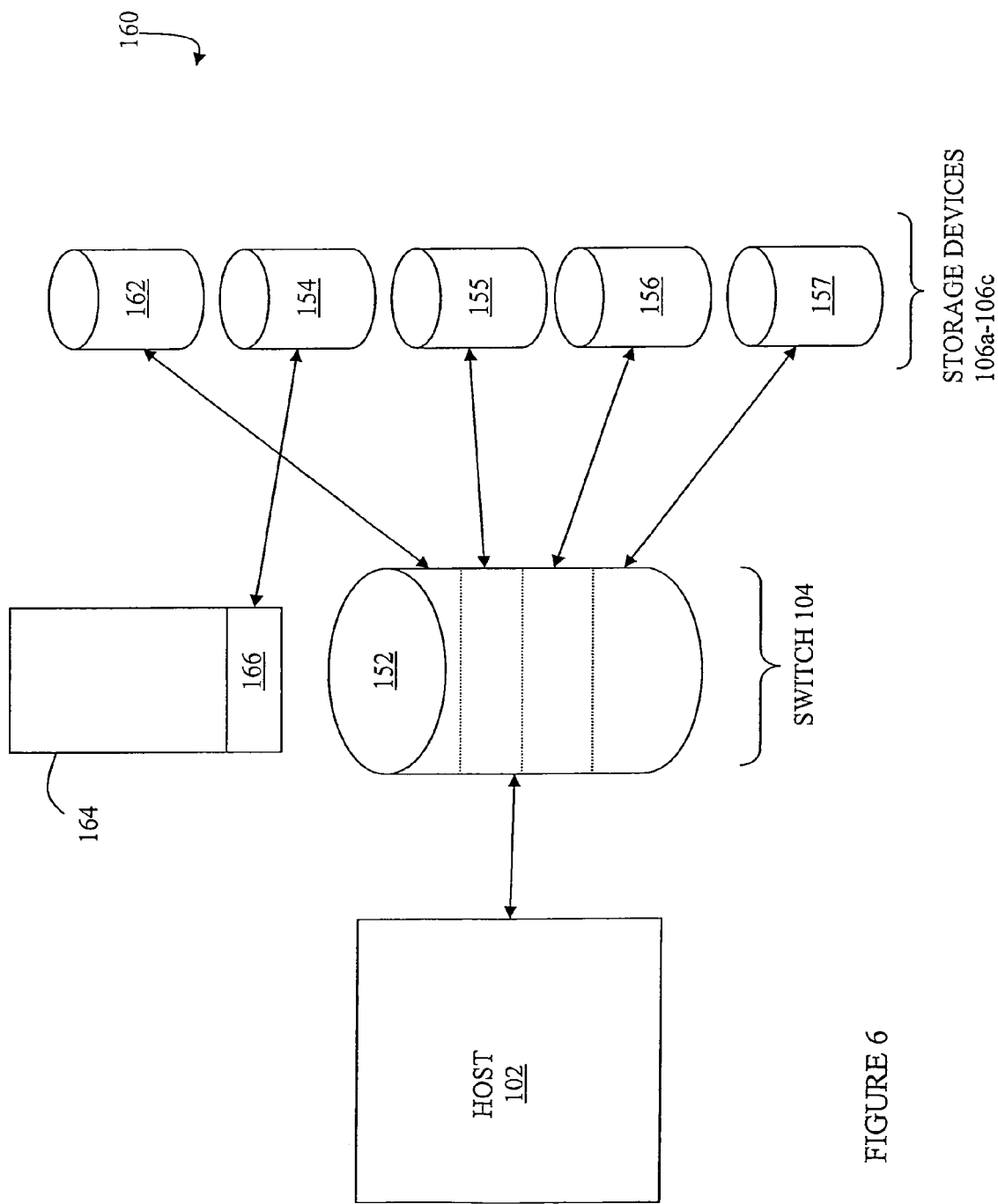
FIG. 6 is a diagram illustrating the host, the logical device, and the plurality of actual storage areas of FIG. 5 after a write by the host creates a first entry in a journal according to the system described herein.

Referring to FIG. 6, a diagram 160 illustrates processing a write by the host 102 to provide for continuous backup of the data. FIG. 6 illustrates data being written by the host 102 to a portion of the logical storage device 152 that initially corresponded to the storage area 154. When the write occurs, a new storage area 162 is allocated on the storage devices 106a-106c, and the portion of the logical storage device 152 is made to point to the new storage area 162 prior to the data write being performed. In addition, a journal 164 is provided for storing information necessary for the continuous backup. In an embodiment herein, the journal 164 contains and entry 166 that has a pointer to the previous storage area 154, a time stamp, and data indicating the status of the write operation (e.g., successful or not). The journal 164 may be provided on the switch 104. In an embodiment herein, the journal is part of the memory 142 of the processor 138 used by the switch backplane 136. In other embodiments, the journal 164 may be may be stored in other locations, such as on the storage device 24 and/or in one of the memories 132-134 of the input ports of the switch 104. In some embodiments, copies of the journal 164 may be stored in more than one location.

Figure 7:
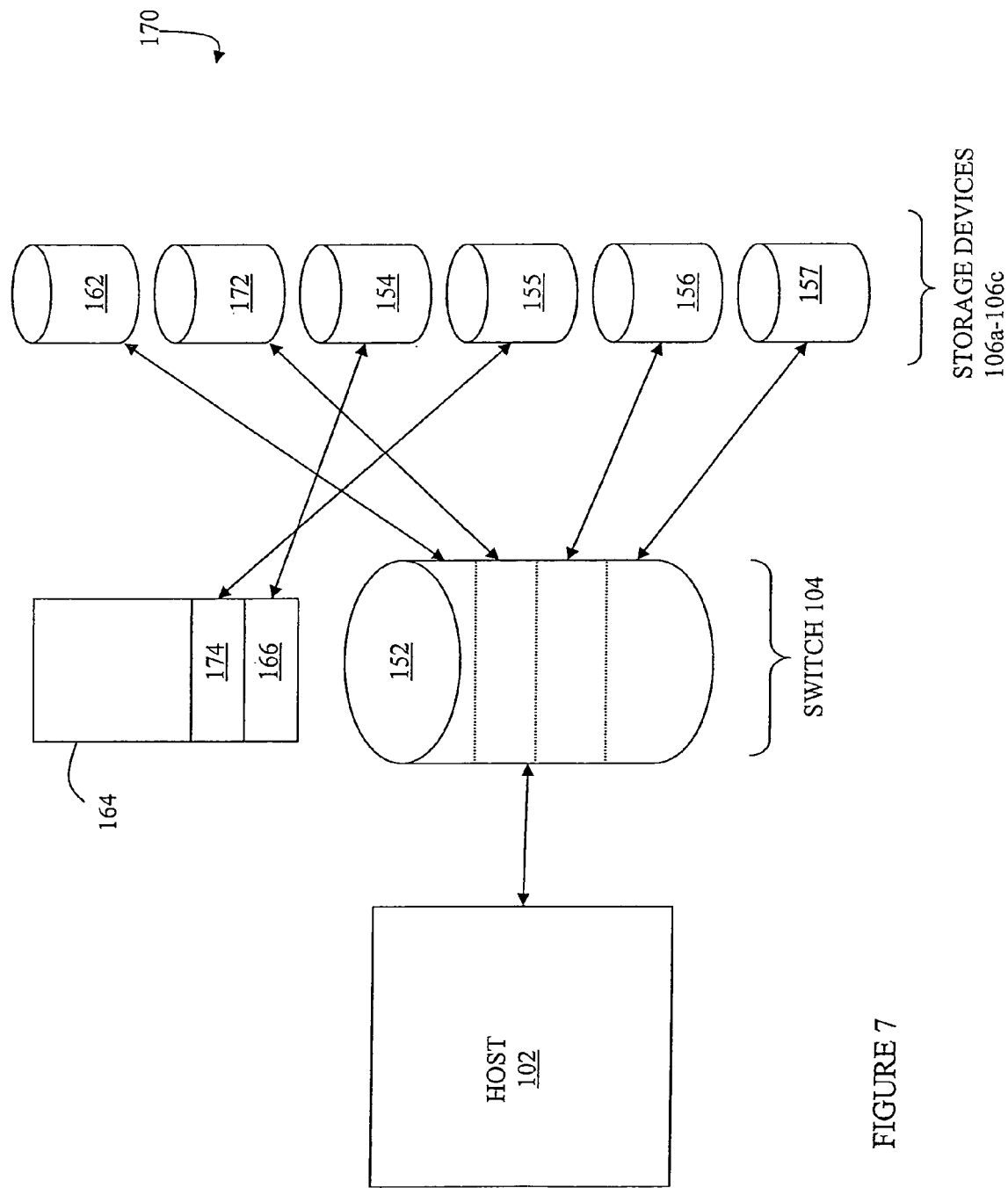
FIG. 7 is a diagram illustrating the host, the logical device, the plurality of actual storage areas and the journal of FIG. 6 after a second write by the host according to the system described herein.

Referring to FIG. 7, a diagram 170 illustrates the result of a second write operation being performed by the host 102 to the logical storage device 152. In the example shown in the diagram 170, the write operation is to an area of the logical storage device 152 that initially pointed to the storage area 155. In connection with the write by the host 102, a new storage area 172 is allocated on the storage devices 106a-106c and the logical storage device 152 is mapped to the new storage area 172. In addition, a new entry 174 is provided to the journal 164 where the new entry 174 points to the storage area 155 previously pointed to by the section of the logical storage device 152 being written by the host 102.

In this way, the journal 164 keeps track of all of the old data storage areas corresponding to each write of new data to the logical storage device 152. Thus, restoring the data using the journal 164 is simply a matter of adjusting the map provided by the switch 104 to cause the logical storage device 152 to map to some of the old storage areas 154, 155. Thus, for example, it is possible to restore the logical device 152 to the state shown by the diagram 160 of FIG. 6 by simply using the journal entry 174 to restore the map for the logical storage device 152 to the state shown in the diagram 160 of FIG. 6. Similarly, it is possible to restore to the logical device 152 to the state shown by the diagram 150 of FIG. 5 by using the journal entries 166, 174 to restore the logical device 152 to the state shown in the diagram 150 of FIG. 5.

Figure 8:
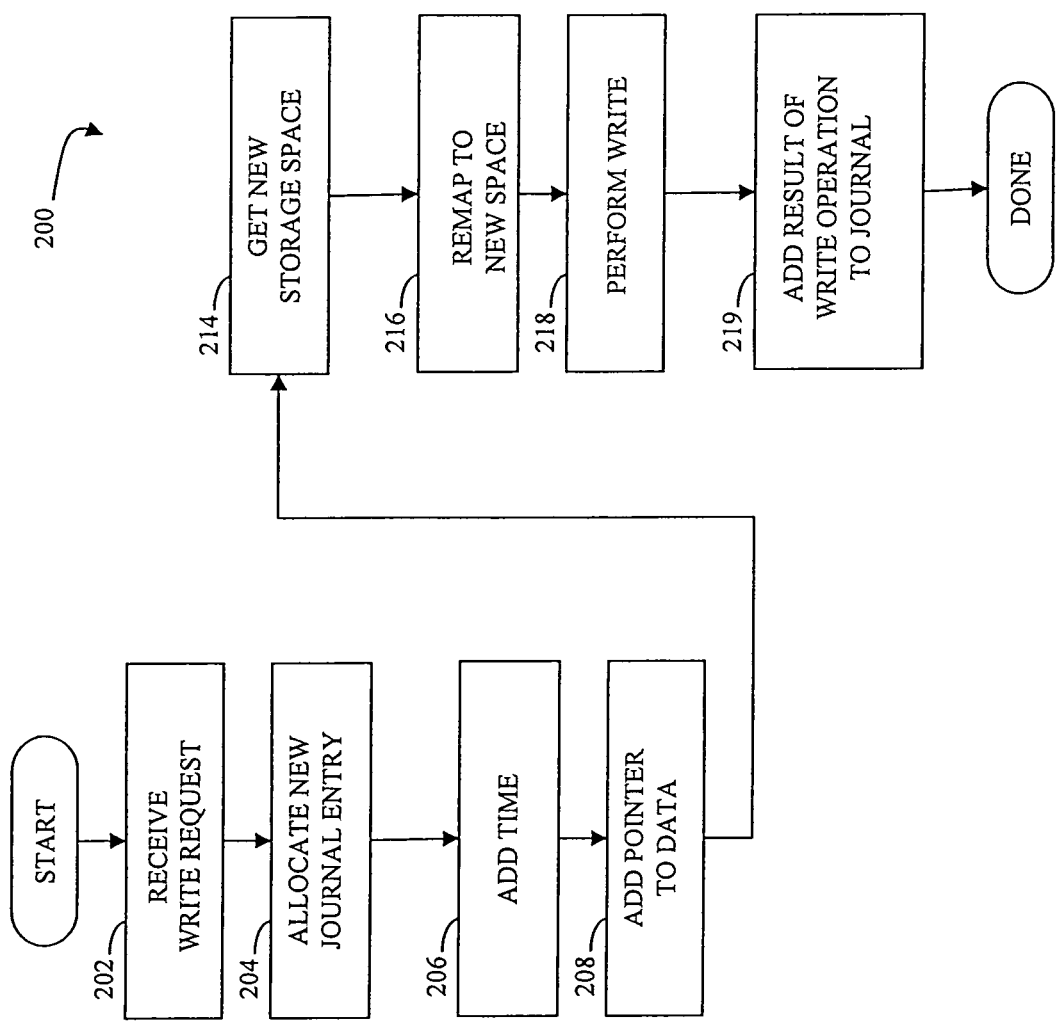
FIG. 8 is a flow chart illustrating steps performed in connection with a write to a logical device according to the system described herein.

Referring to FIG. 8, a diagram 200 illustrates steps performed in connection with a write to a logical device presented by the switch 104 to the host 102. The steps illustrated by the flow chart 200 may be performed by the processor 138 of the backplane 136 or, as described in more detail below, may be performed by each of the local processors 122-124 associated with each of the input ports of the switch 104.

Processing begins at a first step 202 where the processor 138 receives a write request from the one of the processors 122-124 corresponding to the input port where the write is received. Of course, in instances where the steps of the flow chart 202 are performed by the local processors 122-124 (as described in more detail elsewhere herein), then the step 202 may be eliminated. Following the step 202 is a step 204 where space for a new journal entry is allocated. In instances where the journal is provided by a fixed array, the step 204 may simply correspond to incrementing an array pointer. Alternatively, if the journal is provided by a linked list or some other type of similar data structure that uses dynamic memory, then the step 204 may represent allocation of memory. In an embodiment herein, the journal is provided in the memory 142 of the processor 138 of the backplane 136.

Following step 204 is a step 206 where a time value (e.g., time of day/time stamp) is provided to the new journal entry. Following step 206 is a step 208 where the pointer (map to the storage areas 106a-106c) is added to the journal entry. Following the step 208 is a step 214 where new space for the write operation is allocated on the storage devices 106a-106c. Following step 214 is a step 216 where the map for the switch 104 remaps the relevant portions of the logical storage device to the space obtained at the step 214. Following step 216 is a step 218 where the write is performed (i.e., the data is transferred from the host to the appropriate area of the storage devices 106a-106c indicated by the map of the switch). Following step 218 is a step 219 where the status of the write operation (result of the write operation) is added to the journal entry. The step 219 may be performed at a different time in other embodiments. Following the step 219 processing is complete.

Figure 9:
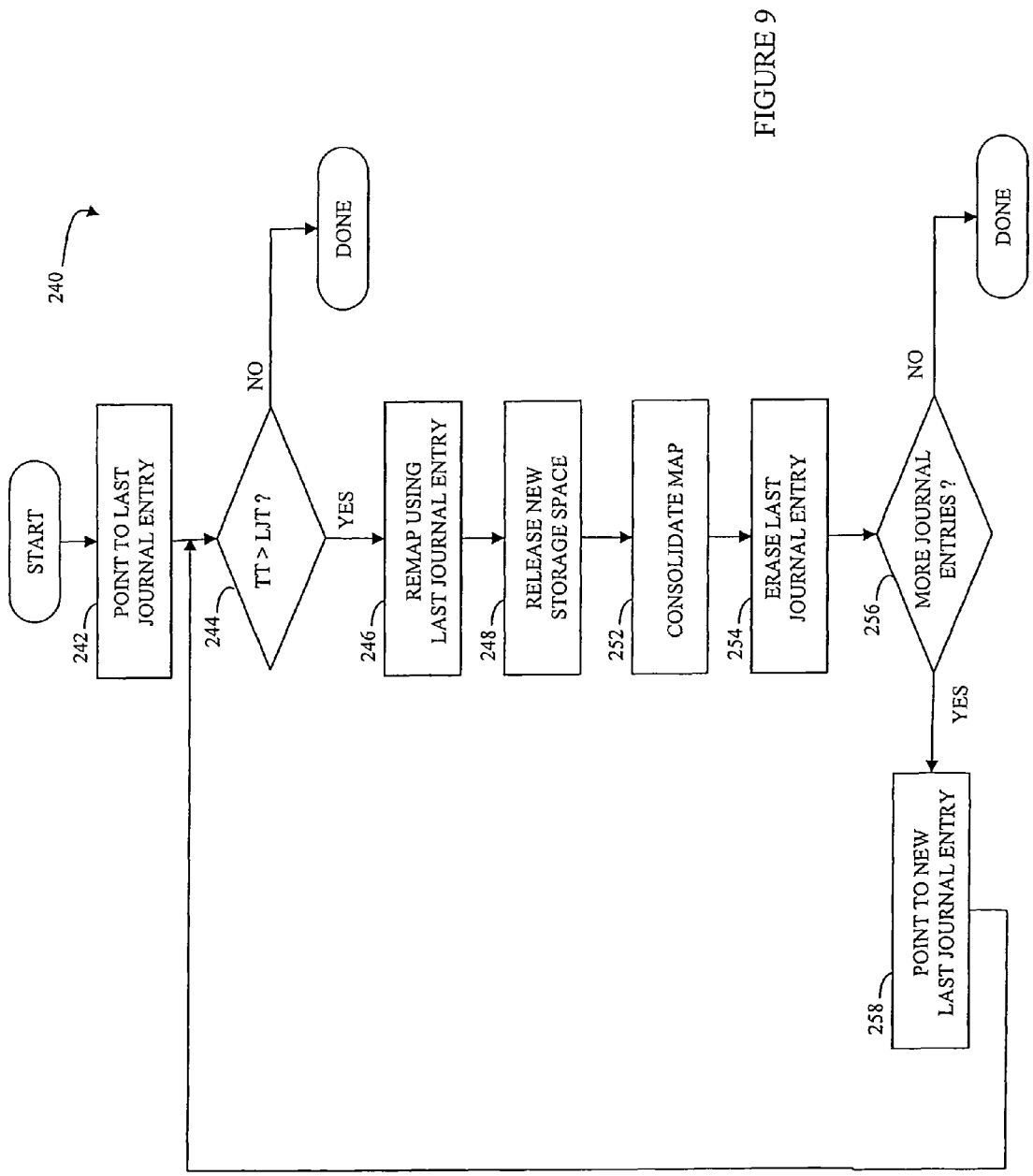
FIG. 9 is a flow chart illustrating steps performed in connection with restoring data to a logical device according to the system described herein.

Referring to FIG. 9, a flow chart 240 illustrates steps performed in connection with restoring the logical device to the state thereof at a particular target time (TT). Restoring the logical device to the state thereof at a particular target time involves, generally, using entries in the journal that occurred after the target time to remap the switch 104 to point to the older data.

Processing begins at a first step 242 where a pointer used to iterate through the journal is made to point to the last (most recent) journal entry. Following the step 242 is a test step 244 where it is determined if the target time (the time at which the logical device was at the state to which the logical device is being restored) is greater than the time corresponding to the last journal entry (the last journal time, LIT). If not, then processing is complete. That is, once the target time is greater than the time of the last journal entry, then the data has been restored so that the logical storage device is in a state that it was in at the target time.

If it is determined at the test step 244 that the target time is not greater than the last journal time, then control passes from the step 244 to a step 246 where the switch is remapped using the last journal entry. At the step 246, the switch map is adjusted so that the mapping indicated by the last journal entry is adopted by the switch to make the logical device being restored have the mapping indicated by the journal entry. Following the step 246 is a step 248 where the storage area(s) of the storage devices 106a-106c that were previously used by the portion corresponding to the restored journal entry is(are) released and made free for use by other processes. Following step 248 is a step 252 where the map of the switch 104 is consolidated. Consolidating the map at the step 252 involves, for example, merging contiguous map entries into a single map entry.

Following the step 252 is a step 254 where the last journal entry that was restored in connection with the steps 246, 248, 252 is erased from the journal. If the journal is provided as an array, then erasing the last journal entry at the step 254 may simply involve decrementing a pointer. On the other hand, if the journal is provided using, for example, linked lists and dynamic memory, then erasing the last journal entry at the step 254 may involve adjusting pointers of the linked list and perhaps freeing the memory used by the node of the link list corresponding to the last journal entry.

Following the step 254 is a test step 256 which determines if there are more journal entries. In some instances, there may be no more journal entries, in which case, processing is complete and the logical device has been restored as far as possible. Otherwise, control transfers from the test step 256 to a step 258 where the pointer that is used to iterate through the journal entries is made to point to a new last journal entry (i.e., the journal entry that became the last journal entry by virtue of erasing the previous last journal entry at the step 254). Following step 258, control transfers back to the test step 244 to determine if the target time is greater than the time of the last journal entry.

In an embodiment herein, efficiencies may be obtained by performing the processing of the flow chart 200 and/or the processing of the flow chart 240 on each of the local processors 122-124 of the input ports. However, one difficulty with this is the possible contention for space on the storage devices 106a-106c by the processors 122-124 of the input ports that are all running in parallel. One way to resolve such a contention is to maintain a single global map at the memory 142 of the processor 138 of the switch backplane 136. In addition, each of the input ports may be assigned a certain range of storage space on the storage devices 106a-106c to be used for mapping. Thus, collisions between the processors 122-124 attempting to use the same area of memory for mapping may be avoided.

Figure 10:
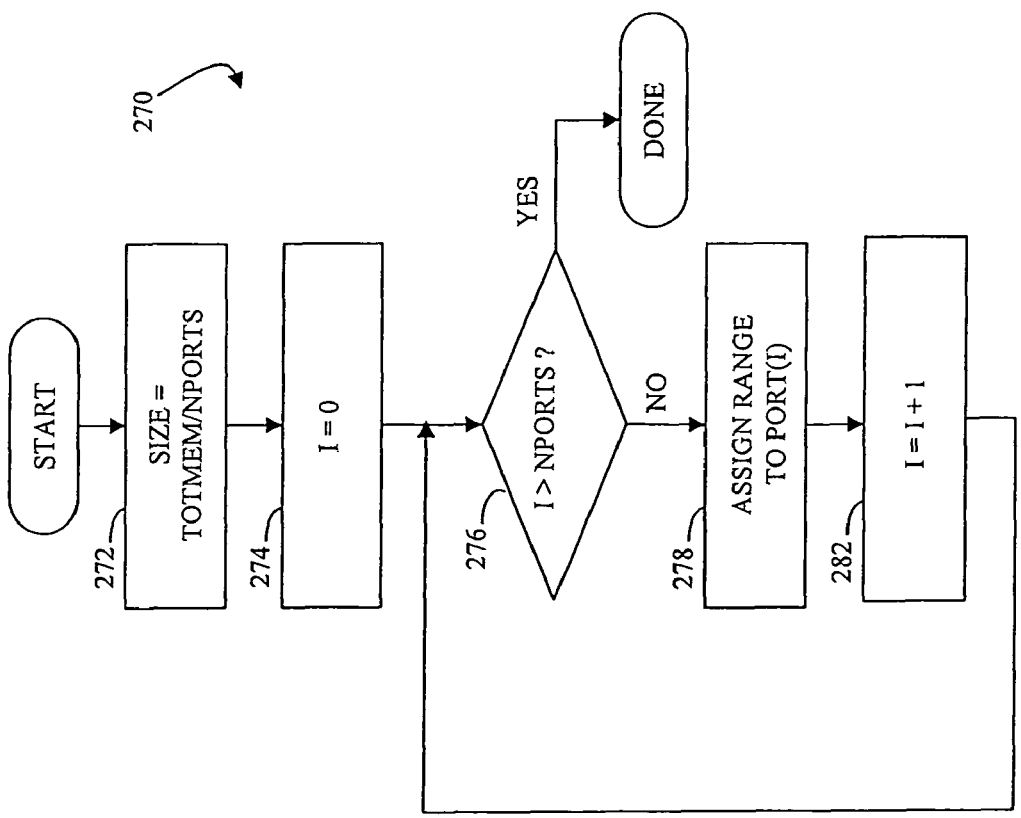
FIG. 10 is a flow chart illustrating steps performed in connection with initializing ports of a switch to facilitate mapping logical storage areas to actual storage areas according to the system described herein.

Referring to FIG. 10, a flow chart 270 illustrates initialization steps performed in connection with assigning certain ranges of storage space to each of the processors 122-124 of the input ports. The steps of the flow chart 270 may be performed by the processor 138 of the switch backplane 136 or may be performed by one or more of the processors 122-124 of the input ports.

Processing begins at a first step 272 where a SIZE quantity is calculated to be the total memory (total storage space available on the storage devices 106a-106c) divided by the number of input ports of the switch. Following the step 272 is a step 274 where an index variable, I, is set to zero. Following the step 274 is a test step 276 where it is determined if the index variable I is greater than or equal to the number of input ports of the switch. If so, then processing is complete. Otherwise, control transfers from the test step 276 to a step 278 where a range from (SIZE*I) to (SIZE*(I+1)) is assigned a port(I). Following the step 278 is a step 282 where the index variable, I, is incremented. Following the step 282, control transfers back to the test step 276, discussed above.

Figure 11:
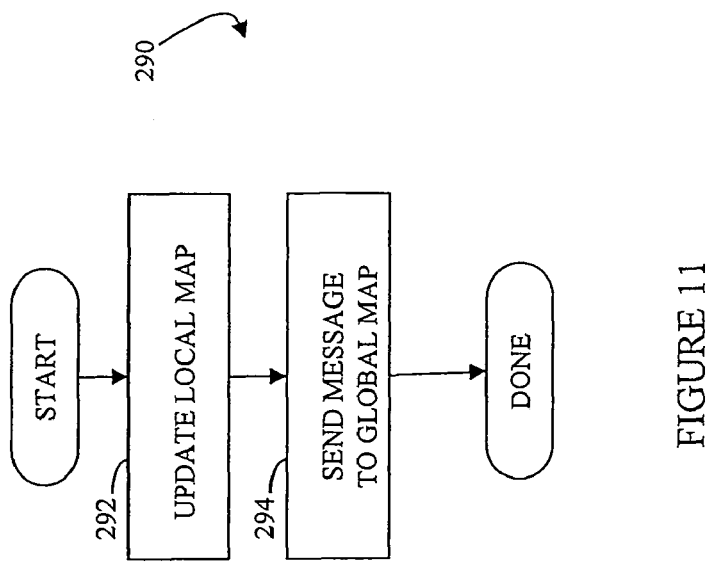
FIG. 11 is a flow chart illustrating steps performed in connection with ports of a switch updating a local map and providing information thereof to a switch backplane according to the system described herein.

Referring to FIG. 11, a flow chart 290 illustrates additional efficiencies that may be obtained by having each of the processors 122-124 maintain a local map in each of the memories 132-134. Changes to the local maps may be communicated asynchronously to the switch backplane 136 for storage in the memory 142 of the processor 138. Processing begins at a first step 292 where the respective one of the processors 122-124 updates a local version of the map stored in local memory thereof. Following the step 292 is a step 294 where a message is sent from one of the processors 122-124 to the processor 138 of the switch backplane 136. Following the step 294, processing is complete.

In an alternative embodiment, the functionality described herein may be provided on a single storage device such as the storage device 24 shown in the diagram 20 of FIG. 1. In such a case, appropriate processing may be performed on one of the HA's 28a-28c and/or one of the DA's 38a-38c, or some combination hereof. For example, the host 22a coupled to the HA 28a may be presented with a logical device managed by the HA 28a. In response to a write by the host 28a, the HA 28a may perform steps similar to those illustrated in the flow chart 200 of FIG. 8. Similarly, in response to a request to restore the logical device to a state thereof at a particular target time, the HA 28a may perform steps like those illustrated in the flow chart 240 of FIG. 9, discussed above.

Of course any combination of storage devices, storage area network, other networks, switches, etc. may be used to provide the functionality illustrated herein. For example, in instances illustrated herein with a host, the host may be replaced by another storage device, a connection to a storage area network, the Internet, or another network, or some other entity that uses data storage. The functionality described herein may be adapted to operate using the system disclosed in U.S. patent application Ser. No. 09/608,521 filed on Jun. 30, 2000, which is incorporated by reference herein, where each of the access interfaces disclosed therein are like the host 102 of the present application and where the resources disclosed therein are like the storage devices 106a-106c of the present application.

While the invention has been disclosed in connection with various embodiments, modifications thereon will be readily apparent to those skilled in the art. Accordingly, the spirit and scope of the invention is set forth in the following claims.

What is claimed is:

1. A switch, comprising:
    a plurality of input ports;
    a plurality of output ports; and
    at least one backplane interposed between the input ports and the output ports, wherein said backplane selectively connects input ports and output ports to provide that, in response to new data being written at one of the input ports, a journal entry that is maintained after the new data is written is created to point to a first storage location on storage space coupled to the output ports, the first storage location pointing to old data that corresponds to and is older than the new data, new storage space having a second storage location is allocated and the new data is written to the new storage space at the second storage location, wherein the old data is maintained in the storage space at the first storage location after the new data is written to the new storage space at the second storage location.

2. The switch, according to claim 1, further comprising:
    a memory that is part of the backplane, wherein the journal entry is stored in the memory.

3. The switch, according to claim 2, wherein the journal entry is part of a journal that is stored in the memory.

4. The switch, according to claim 1, further comprising:
    a processor that is disposed within the backplane.

5. The switch, according to claim 4, wherein the processor includes executable code that causes the switch to create the journal entry and to allocate the new storage space.

6. The switch, according to claim 1, wherein the storage space is provided by at least one storage device.

7. The switch, according to claim 6, wherein allocating new storage space includes remapping the switch coupled to the at least one storage device.

8. The switch, according to claim 7, wherein the new data is written by a host coupled to the switch.

9. The switch, according to claim 8, wherein the switch presents the host with a logical storage area that is created by the switch mapping to different locations of the at least one storage device.

10. The switch, according to claim 8, wherein the mapping is transparent to the host.

11. The switch, according to claim 1, wherein the storage space corresponds to a disk array storage device.

12. The switch, according to claim 11, wherein the journal entry is stored in the disk array storage device.

13. The switch, according to claim 11, wherein the journal entry is stored outside the disk array storage device.

14. The switch, according to claim 1, wherein each of the journal entries also includes a time stamp.

15. The switch, according to claim 1, wherein each of the journal entries also includes a result of writing the data.

16. A data storage device, comprising:
    at least one disk drive that contains data;
    at least one host adaptor, coupled to the at least one disk drive, that receives data to be stored on the at least one disk drive; and
    computer software that handles writing new data, wherein the computer software includes executable code that creates a journal entry that points to a first storage location containing old data that corresponds to and is older than the new data, wherein the journal entry is maintained after writing the new data, executable code that allocates new storage space having a second storage location, and executable code that writes the new data to the new storage space at the second storage location, wherein the old data is maintained at the first storage location after the new data is written to the new storage space at the second storage location.

17. The data storage device, according to claim 16, wherein allocating new storage space includes remapping a switch coupled to the data storage device.

18. The data storage device, according to claim 17, wherein the switch is a logical storage area that is created by the switch mapping to different locations of the data storage device.

19. The data storage device, according to claim 16, wherein each of the journal entries also includes a time stamp.

20. The data storage device, according to claim 16, wherein each of the journal entries also includes a result of writing the data.

* * * * *